(12) United States Patent
Van Hoven

(10) Patent No.: US 8,079,325 B2
(45) Date of Patent: Dec. 20, 2011

(54) MILKING ARRANGEMENT AND METHOD

(75) Inventor: Fernand Van Hoven, Gorssel (NL)

(73) Assignee: DeLaval Holding AB, Tumba (SE)

( * ) Notice: Subject to any disclaimer, the term of this patent is extended or adjusted under 35 U.S.C. 154(b) by 218 days.

(21) Appl. No.: 12/439,866

(22) PCT Filed: Aug. 30, 2007

(86) PCT No.: PCT/SE2007/000756
§ 371 (c)(1),
(2), (4) Date: May 29, 2009

(87) PCT Pub. No.: WO2008/030156
PCT Pub. Date: Mar. 13, 2008

(65) Prior Publication Data
US 2010/0192861 A1    Aug. 5, 2010

(30) Foreign Application Priority Data

Sep. 5, 2006  (SE) ..................... 0601821

(51) Int. Cl.
*A01J 5/00*      (2006.01)
*A01K 1/12*     (2006.01)
(52) U.S. Cl. .................... 119/14.03; 119/14.08
(58) Field of Classification Search ............... 119/14.03, 119/14.04, 14.08, 14.1, 520, 51.02
See application file for complete search history.

(56) References Cited

U.S. PATENT DOCUMENTS

| | | | | |
|---|---|---|---|---|
| 2,039,562 A * | 5/1936 | Shodron | ................... | 119/14.03 |
| 5,241,924 A * | 9/1993 | Lundin et al. | ............... | 119/51.02 |
| 5,816,190 A * | 10/1998 | van der Lely | ............... | 119/14.08 |
| 6,186,093 B1 * | 2/2001 | Finn et al. | .................. | 119/14.03 |
| 6,213,052 B1 * | 4/2001 | Oosterling | ................ | 119/14.08 |
| 7,874,263 B2 * | 1/2011 | Schulte | ....................... | 119/14.02 |
| 2004/0011294 A1 * | 1/2004 | Guo | ............................ | 119/14.02 |
| 2004/0261723 A1 * | 12/2004 | Birk | ........................... | 119/14.02 |
| 2008/0017118 A1 * | 1/2008 | Wigholm et al. | .......... | 119/14.03 |
| 2010/0192860 A1 * | 8/2010 | Van Hoven | ................ | 119/14.02 |
| 2010/0236486 A1 * | 9/2010 | Petersen | .................... | 119/14.03 |

FOREIGN PATENT DOCUMENTS

| | | |
|---|---|---|
| EP | 0 608 943 | 8/1994 |
| WO | 03/000044 | 1/2003 |
| WO | 2004/068940 | 8/2004 |
| WO | WO 2004068940 A1 * | 8/2004 |

OTHER PUBLICATIONS

International Search Report dated Dec. 12, 2007, from corresponding PCT application.

* cited by examiner

*Primary Examiner* — Rob Swiatek
*Assistant Examiner* — Lisa Tsang
(74) *Attorney, Agent, or Firm* — Young & Thompson

(57) ABSTRACT

An arrangement for housing and milking a large number of animals includes a resting and feeding area (11), a milking area (13) housing automatic milking stations (31) for milking the animals, and a passage way (15) interconnecting the resting and feeding area (11) and the milking area (13), and along which animals are capable of being had to walk in order to move back and fourth between the resting and feeding area (11) and the milking area (13). According to the invention, the resting and feeding area (11) includes enclosed sections (17), wherein each of the sections (17) houses a respective subgroup of the animals and has an entry/exit gate (19), through which the animals of the subgroup are capable of being forced to pass in order to move back and fourth between the section (17) and the passage way (15).

21 Claims, 2 Drawing Sheets

MILKING ARRANGEMENT AND METHOD

TECHNICAL FIELD OF THE INVENTION

The present invention relates generally to dairy farming, and more specifically the invention relates to an arrangement for housing and milking a large number of milking animals, and to a method for milking therein.

DESCRIPTION OF RELATED ART AND BACKGROUND OF THE INVENTION

An animal arrangement for housing large stocks of milking animals, e.g. hundreds or even thousands of milking animals, may comprise resting and feeding areas wherein the milking animals are allowed to rest and are fed, and a milking area housing a plurality of milking positions for milking the milking animals.

Typically, very large stocks of milking animals are milked batch wise in for example parallel stall, Herringbone, or rotary milking systems at predetermined periods of times.

Voluntary milking systems for fully automated milking are well known in the art. They have typically been implemented for smaller herds of animals, i.e. up to 100 milking animals, in housed environments. However, when milking large stocks of milking animals automatically in voluntary milking systems some problems arise.

Voluntary milking does, however, not guarantee that each milking animal is milked at least two or three times per day, particularly not at least two or three times per day with regular milking intervals. Farmers that milk their milking animals three times per day in a batch wise milking system and that switch to voluntary milking may suffer from a milk production loss of larger than 5% due to fewer number of milkings per day and more irregular milking intervals.

Another problem encountered in automatic animal arrangements housing large stocks of milking animals is the difficulties in obtaining high milking machine utilization. This problem is particularly noticeable in very large arrangements partitioned in different sections, and which have a large number of milking robots for milking.

Yet another problem encountered is that it is more difficult to monitor and control the milking animals and their movements.

Still another problem arises when a particular milking animal, which for example has to be treated manually by the farmer, shall be found. Even if the milking animals are housed in different sections it may be troublesome and time consuming to find the particular milking animal.

SUMMARY OF THE INVENTION

A general object of the present invention is thus to provide an arrangement for housing and milking a large number of milking animals, which solves or alleviates at least some of the above mentioned problems and shortcomings associated with the prior art.

In this respect there is a particular object of the invention to provide such an arrangement, which provides for an efficient milking production with high milk yields and with high milking machine utilization.

It is a further object of the invention to provide such an arrangement, which use the available space efficiently in order to be capable of housing a large number of milking animals per unit area.

It is still a further object of the invention to provide such an arrangement, which is flexible, reliable, of fairly low cost, and relatively easy to implement.

It is yet a further object of the invention to provide a method for milking a large number of milking animals, which can be implemented in an arrangement that fulfills any of the above mentioned objects.

These objects, among others, are according to the present invention attained by arrangements and methods as specified in the appended patent claims.

According to a first aspect of the invention an arrangement is provided, which comprises a resting and feeding area wherein the milking animals are allowed to rest and are supplied with feed, a milking area housing a plurality of automatic milking stations for milking the milking animals, and a passage way interconnecting the resting and feeding area and the milking area, and along which milking animals are capable of being had to walk in order to move back and fourth between the resting and feeding area and the milking area. The resting and feeding area comprises enclosed sections, wherein each of the sections houses a respective subgroup of the milking animals and has an entry/exit gate, through which the animals of the subgroup are capable of being had to pass in order to move back and fourth between the section and the passage way. Each of the automatic milking stations comprises milking equipment, which is automatically attached to the teats of a milking animal present in the automatic milking station by a robot arm.

Hereby, the milking animals are milked in automatic milking stations, but are forced, particularly gently pushed, or enticed back and fourth between the resting and feeding area and the automatic milking stations in the milking area. The benefits of an automatic milking station are achieved, simultaneously as the milking animals may be milked three times per day with regular milking intervals. High milk production and high milking station utilization may be achieved without the mixing of the milking animals that belong to different subgroups.

The layout of the arrangement provides for an efficient use of available space.

In one embodiment of the invention a first plurality of the sections are arranged in a row along a first side of the passage way and a second plurality of the sections are arranged in a row along a second side of the passage way, which is opposite to the first side of the passage way.

In another embodiment one plurality of the sections and another plurality of the sections are arranged on opposite sides of the milking area.

In still another embodiment sections of the above kind are arranged in rows on each side of the passage way and on each side of the milking area.

By any one of these embodiments the available space is even better utilized. They provide for a compact design wherein the distance each milking animal has to walk between the section and the milking area is minimized.

As non-limiting figures the arrangement may comprise between about 4 and 16 sections. Each section may house between about 40 and 100 milking animals and have an area of between about 200 and 600 square meters.

Preferably, the resting and feeding area is provided with one or two feed alleys arranged along the sections, in which feed alleys a feeding vehicle or other apparatus is capable of moving while supplying feed to the sections. Hereby, the feeding of the milking animals can be made easily, efficiently, and quickly.

The milking area may comprise a pre-milking waiting area in front of the automatic milking stations sized to simultaneously house the milking animals from one of the sections, an exit passage provided for receiving the milking animals after having exited from the automatic milking stations, and a post-milking waiting area provided for keeping milking animals from one of the sections while milking animals from another of the sections are forced through the passage way to the pre-milking waiting area. Hereby, the traffic of milking animals from different sections can be separated and controlled.

Further, the milking area may comprise a treatment area, to which milking animals that are to be treated are allowed or forced to enter, possibly after having been identified after having exited the automatic milking stations. That is a selection gate may be provided to allow each milking animal to enter either the post-milking waiting area or the treatment area. Hereby, particular milking animals that should be inspected or treated by the farmer may be automatically collected in the treatment area subsequent to having been milked.

Depending on the number of milking animals housed by the arrangement and the number of sections provided and in order to increase the efficiency of the arrangements, a plurality of automatic milking station groups, pre-milking waiting areas, exit passages, post-milking areas, and treatment areas may be provided in order to milk milking animals from a plurality of sections simultaneously.

According to a second aspect of the invention a method is provided in a milking arrangement of the first aspect of the invention, comprising the steps of having milking animals of a subgroup to walk from one of the enclosed sections and along the passage way to the milking area and into the plurality of automatic milking stations, automatically attaching milking equipment of the plurality of automatic milking stations to the teats of the milking animals of the subgroup by at least one robot arm, automatically milking the milking animals of the subgroup in the plurality of automatic milking stations, and having the milking animals of the subgroup to walk along the passage way from the plurality of automatic milking stations and back to the one of the enclosed sections.

Preferably, the milking animals of the subgroup are kept in a pre-milking waiting area in front of the automatic milking stations before entering the automatic milking stations, and at least some of them are kept in a post-milking area while milking animals from another section are had to walk from that section to the pre-milking waiting area. The milking animals of the subgroup that are kept in the post-milking area may be those that have not yet reached the post-milking area when it is determined to move the milking animals in the post-milking waiting area back to a section and to move milking animals from another section to the pre-milking waiting area. Such procedure may have to be taken in order to not operate the milking stations continuously. (It would have been bad utilization of the milking stations to have all the animals from one subgroup to return to their section before bring animals from another section to the milking stations.) Note that early milked animals may be allowed to voluntarily return to their sections. Only the animals that are in the post-milking waiting area (and possibly in the passage way) when it is determined to bring milking animals from another section to the pre-milking waiting area are forced back to their section.

The milking animals of the subgroup that are kept in the post-milking area are had to walk back to their section as soon as the milking animals from the other section have entered the pre-milking waiting area. In such manner an efficient movement of milking animals back and forth between the sections and the milking area is achieved without mixing animals from different subgroups.

The above disclosed method is advantageously repeated for the milking animals of each of the subgroups, and when the method has been repeated for the milking animals of each of the subgroups, the method is repeated again and again for the milking animals of each of the subgroups to obtain continuous operation of the arrangement during the day as well as the night, i.e. continuous 24 hours operation.

Typically, the milking method is performed by one or several farmers that manually gently pushes or in other manner forces or entices the milking animals in the pattern disclosed. However, some or each of the different sections and areas, i.e. the sections, the passage way, the pre-milking waiting area(s), the exit passage(s), the post-milking area(s), and the treatment area(s) may be provided with a respective movable crowd gate that can be operated to automatically move within an section or area to force milking animals therein to leave that section or area. Hereby, the farmer(s) can be relieved from hard and time consuming work in connection with the milking of the milking animals.

Further characteristics of the invention and advantages thereof, will be evident from the following detailed description of preferred embodiments of the present invention given hereinafter and the accompanying FIGS. 1-2, which are given by way of illustration only and thus, are not limitative of the present invention.

DETAILED DESCRIPTION OF EMBODIMENTS

Figure 1:
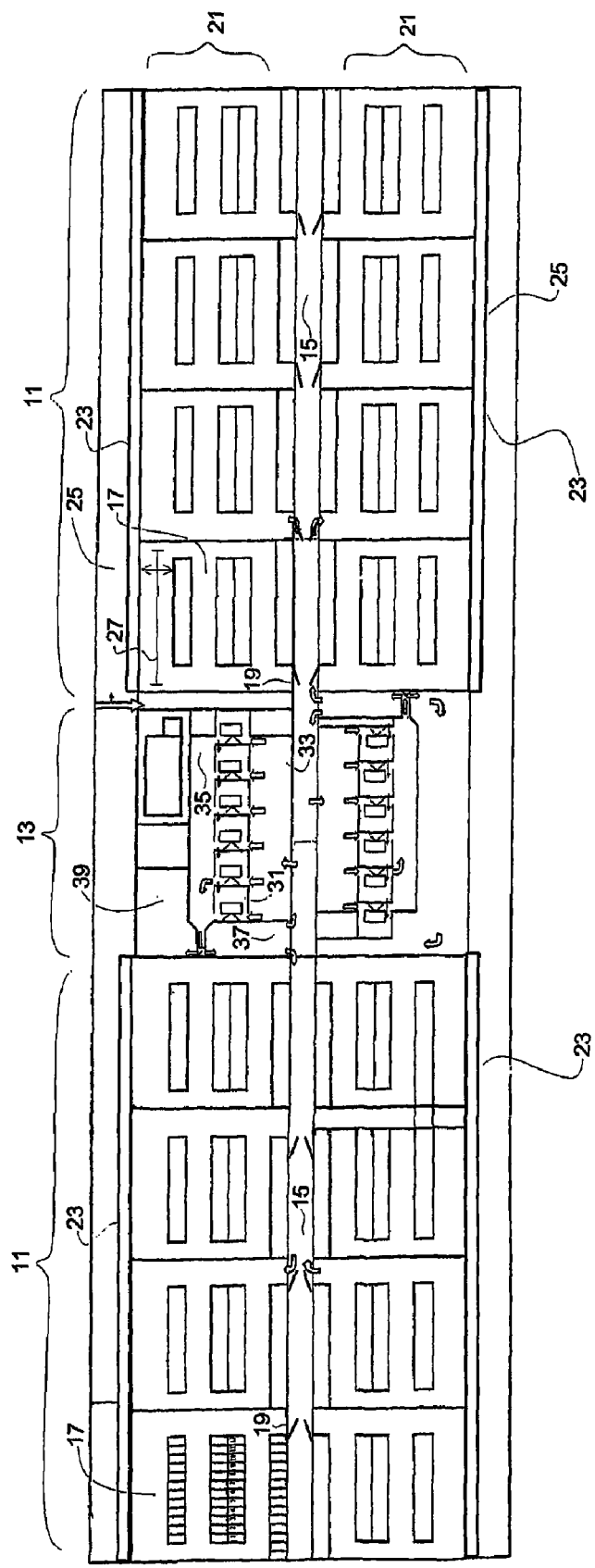
FIG. 1 illustrates schematically, in a top view, an arrangement for housing and milking a large number of milking animals according to an embodiment of the present invention.
Figure 2:
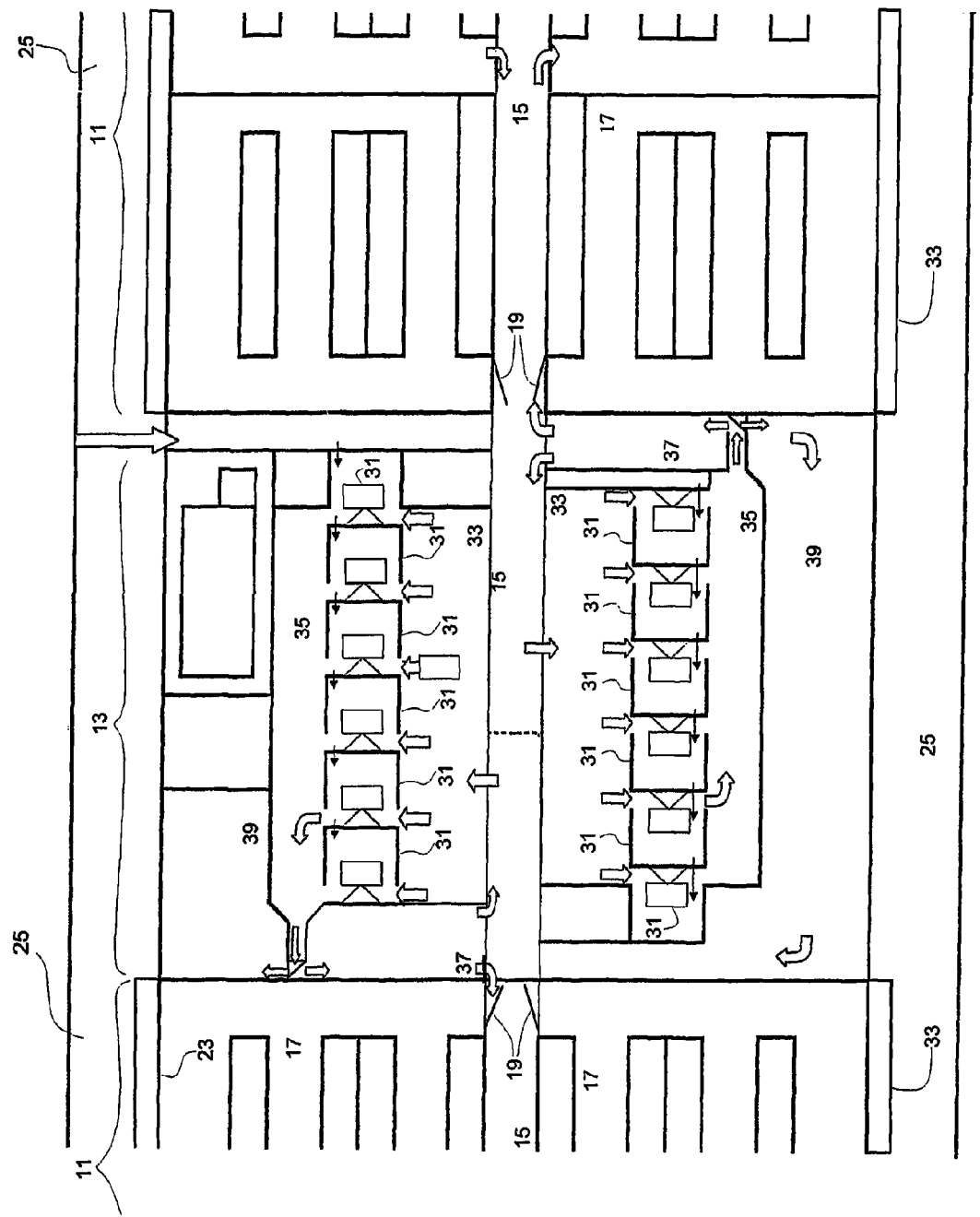
FIG. 2 illustrates schematically, in a top view, central sections of the arrangement of FIG. 1 in greater detail.

An arrangement for housing and milking a large number of milking animals as being illustrated in FIGS. 1-2 comprises a resting and feeding area 11 wherein the milking animals are allowed to rest and are supplied with feed, a milking area 13 for milking the milking animals, and a passage way or walkway interconnecting the resting and feeding area 11 and the milking area 13 and along which milking animals are capable of being forced to walk in order to move back and fourth between the resting and feeding area 11 and the milking area 13.

The resting and feeding area 11 comprises enclosed sections 17, each being adapted to house a respective subgroup of the milking animals and having an entry/exit gate 19, through which the animals of the subgroup are capable of being forced to pass in order to move back and fourth between the section 17 and the passage way 15. In the illustrated embodiment the resting and feeding area 11 comprises 16 enclosed sections arranged in four rows; two rows at either side of the passage way 15 and two rows at either side of the milking area 13. However, in other embodiments there may be another number of sections arranged in another number of rows that are oriented with respect to each other and with respect to the passage way 15 and the milking area 13 in other manners. Preferably though, the resting and feeding area 11 comprises at least 4 enclosed sections, more preferably at least 10 enclosed sections, and most preferably at least 16 enclosed sections.

Each of the sections 17 may be arranged for housing between about 40 and 100 milking animals, preferably between about 50 and 80 milking animals, and most preferably between about 50 and 70 milking animals. Each of the sections 17 may occupy an area of between about 200 and 600 square meters, and preferably between about 250 and 400 square meters.

Further, each of the sections comprises a feeding area 23 in an end thereof, which is opposite to an end that faces the passage way 15. One or several (in the illustrated embodiment two) feed alleys 25 may arranged along the feeding areas 23 outside of the sections 17. During feeding, a feeding vehicle or other apparatus moves in the feed alleys 25 while supplying feed to the feeding areas 23.

The milking area 13 houses a plurality of automatic milking stations 31, each comprising milking equipment that is automatically attached to the teats of a milking animal present in the automatic milking station by a robot arm prior to milking. In the illustrated embodiment the automatic milking stations 31 are arranged in two separate batteries for the separate milking of milking animals from different subgroups, which batteries thus define two separate milking places. However, in other embodiments there may be only one battery of automatic milking stations or more than two batteries of automatic milking stations. There may be provided one robot arm for each automatic milking station 31, or possibly fewer if each robot arm serves more than one milking station.

An animal identifier arrangement is preferably provided for automatically identifying the milking animals when or after having entered one of the automatic milking stations 31. In one embodiment an animal identifier device is provided within, or in front of, each of the automatic milking stations 31.

Each of the automatic milking stations 31 may comprise much more equipment for performing various activities in connection with the milking. Each of the automatic milking stations 31 may be the DeLaval Voluntary Milking System or any other automated milking system having the capability of automatically attaching teat cups to teats of milking animals.

Each milking place (as defined by a battery of automatic milking stations) may comprise a pre-milking waiting area 33, an exit passage 35, a post-milking waiting area 37, and optionally a treatment area 39, wherein each of the areas is enclosable.

Each pre-milking waiting area 33 is arranged between the passage way 15 and one of the batteries of automatic milking stations 31 so that the milking animals first can enter a pre-milking waiting area 33 of one of the milking places from the passage way 15 and thereafter can enter the automatic milking stations 31 of one of the batteries of automatic milking stations. To this end the pre-milking waiting areas 33 have each a size large enough to simultaneously house all milking animals from one section 17.

After having been milked the milking animals enter one of the exit passages 35. Advantageously, the exit passages 35 are each wide enough to allow milking animals to pass each other therein.

From one of the exit passages 35 the milking animals enter either one of the post-milking waiting areas 37 or one of the treatment areas 39, possibly after having been identified in the exit passage 35. Milking animals that are guided to the treatment areas are kept therein until they have been examined or treated.

The arrangement thus being described is space efficient and provides for efficient milking production. In one embodiment the arrangement of FIG. 1 is arranged in a building measuring 49 m×166 m and is aimed for housing about 800 cows, wherein each section 17 measures 17 m×18 m. Twelve automatic milking stations may milk twelve milking animals in about eight minutes. During 24 hours the twelve automatic milking stations may thus perform 2160 milkings. Running the arrangement 24 hours a day, an average of 2160/800 milkings per milking animal is achieved.

A method for milking a large number of milking animals in the arrangement of FIGS. 1-2 will next be described.

Milking animals of a subgroup are fetched from one of the enclosed sections 17 and are forced, e.g. gently pushed, to walk along the passage way 15 to said milking area 13 and into anyone of the pre-milking waiting areas 33. Preferably, the pre-milking waiting areas 33 are provided with lockable one-way gates so that a milking animal that has entered a pre-milking waiting area cannot walk back into the passage way. The milking animals are then voluntarily or otherwise had to enter a respective automatic milking station 31. Therein, milking equipment is automatically attached to the teats of the milking animals of the subgroup by at least one robot arm and the milking animals of the subgroup are automatically milked.

Then, the milking animals are allowed to enter the exit passage 35 next to the automatic milking stations and are allowed to enter the adjacent post-milking milking area 37 or treatment area 39 from the exit passage 35 after having been identified. To this end, a smart gate equipped with an identification device may be provided in the exit passage 35. The first milking animals of the subgroup that have been milked and that have reached the post-milking milking area 37 are preferably allowed to walk along the passage way 15 back to their section 17.

At a certain moment, e.g. when the last milking animals of the subgroup have entered a respective automatic milking station 31 (some milking animals may have to be forced, e.g. gently pushed, to enter an automatic milking station 31), the farmer decides to bring the milking animals from another section to the same pre-milking waiting area 33. The milking animals in the post-milking area 37 of the previous subgroup are then had to leave the post-milking area 37, after which the post-milking area 37 is closed. These milking animals are moved back to their section and the milking animals from the other section are had to move to the pre-milking waiting area 33.

The remaining milking animals in the exit passage 35 and the post-milking area 37 of the previous subgroup have to stay in the exit passage 35 and/or in the post-milking area 37 until all milking animals from the next subgroup have left the passage way 15 and have all entered the pre-milking waiting area 33.

As soon as the milking animals from the other section have all entered the pre-milking waiting area 33, the milking animals that are kept in the post-milking area 37 are allowed or had to walk back to their section.

Milked milking animals from the next subgroup are allowed to leave a milking station 31 as soon as all milking animals from the previous subgroup have left the exit passage 35.

The above-described procedure is repeated for the milking animals of each of the subgroups, and when the procedure has been repeated for the milking animals of each of the subgroups, the procedure is repeated again and again for the milking animals of each of the subgroups to obtain continuous 24 hours operation of the arrangement.

The method thus being described combines the benefits of batch or group wise milking with those of robot milking. Efficient milking production is achieved with high milk yields and with high milking machine utilization without the mixing of milking animals belonging to different subgroups.

It shall be appreciated that the two milking places on each side of the passage way 15 may be arranged for simultaneous milking of milking animals from different subgroups. Advantageously, the milking animals housed in the sections at a respective side of the milking area 13 are milked at a respective milking place. If different farmers or persons handles the traffic of the milking animals to and from, and milking of the milking animals at, different milking places they can be run almost completely independently of each other. If a single farmer/person is responsible he/she fetches milking animals from different sides of the milking area 13 each time: a phase shift corresponding to about half the time for the milking of the milking animals of a subgroup is will typically exist between the milking places.

It shall yet further be appreciated that milking animals may be forced to walk within the arrangement by moving one or several automatically run crowd gates to assist the farmer in his/her work. One such crowd gate is illustrated as detail 27. The gates may be hanging from a ceiling and may be capable of being lowered from the ceiling and movable along rails in the ceiling. They may be operated manually by the farmer or may be provided with motors and control units, whereby they can be entirely automatically run under the control of a control device. Such control device may be responsible for many tasks in the arrangement and may take decisions when milking animals should be moved from one position to another.

The following areas may be provided with gates of the above kind: the sections 17, the passage way 15, the pre-milking waiting areas 33, the exit passages 35, the post-milking areas 37, and the treatment areas 39. In case each area is provided with automatically run movable gates the arrangement could in principle be run almost or entirely automatically.

Further, the passage way 15 may be provided with gates that prevents milking animals from walking to far when being moved to the milking area 13 or back to their respective sections 17. The gates between the sections 17 and the passage way 15 may be operated manually or in automatic mode, possibly with aid of identification of milking animals.

The invention claimed is:

1. An arrangement for housing and milking a large number of milking animals, comprising:
   a resting and feeding area (11) wherein the milking animals are allowed to rest and are supplied with feed;
   a milking area (13) housing a plurality of automatic milking stations (31) for milking the milking animals, each automatic milking station (31) comprising milking equipment which is automatically attached to the teats of a milking animal present in the automatic milking station by a robot arm; and
   a passage way (15) interconnecting the resting and feeding area (11) and the milking area (13), and along which passage way (15) milking animals are capable of being walked in order to move back and forth between the resting and feeding area (11) and the milking area (13), wherein,
   the resting and feeding area (11) comprises plural adjacently located enclosed sections (17),
   each of the sections (17) is sized to house plural of said milking animals defining a respective subgroup of said milking animals,
   each of the sections (17) having a respective entry/exit gate (19) opening at a different location into said passage way (15), through which respective entry/exit gate (19) the animals of the subgroup are capable of passing in order to move back and forth between the section (17) and the passage way (15);
   a first plurality of said sections (17) are arranged in a first row (21) along a first side of the passage way (15) so that a first end of each of said first plurality of said sections (17) faces the first side of said passage way (15),
   wherein each of said first plurality of said sections (17) comprises a first feeding area (23) in a second end thereof, which second end is opposite to the first end thereof that faces the first side of said passage way (15).

2. The arrangement of claim 1, wherein said resting and feeding area (11) further comprises a feed alley (25) arranged along the feeding areas (23) outside of said first plurality of said sections (17), in which feed alley (25) a feeding vehicle or other apparatus is capable of moving while supplying feed to the feeding areas (23).

3. The arrangement of claim 2, wherein,
   a second plurality of said sections (17) are arranged in a second row (21) along a second side of the passage way (15), which second side of the passage way is opposite to said first side of the passage way so that a first end of each of said second plurality of said sections (17) faces the second side of said passage way (15), and
   each of said second plurality of said sections (17) comprises a second feeding area (23) in a second end thereof, which second end is opposite to the first end thereof that faces the second side of said passage way (15).

4. The arrangement of claim 3, wherein,
   said first and second plurality of said sections (17) define a first group of said sections arranged on a first side of said milking area (13),
   a second group of said sections are arranged on an opposite, second side of said milking area, and
   said passage way (15) extends through said first group of said sections, through said milking area, and through said second group of said sections dividing each of said first group of said sections, said milking area, and said second group of said section into a respective upper and lower side areas.

5. The arrangement of claim 1, wherein each of said sections (17) is arranged for housing between about 40 and 100 milking animals.

6. The arrangement of claim 1, wherein each of said sections (17) has an area of between about 200 and 600 square meters.

7. The arrangement of claim 1 wherein each of said sections (17) comprises a crowd gate (27) provided for forcing milking animals within said section (17) out from there.

8. The arrangement of claim 1, wherein each of said first row and said second row of adjacent sections comprises at least 4 adjacent sections (17).

9. The arrangement of claim 1 wherein said resting and row (21) is a loose house area.

10. The arrangement of claim 1 wherein said milking area (13) comprises a pre-milking waiting area (33) in front of said plurality of automatic milking stations (31), said pre-milking waiting area (33) being sized to simultaneously house the milking animals from one of said sections (17), said passage way (15) connecting to said pre-milking waiting area.

11. The arrangement of claim 10 wherein said pre-milking waiting area (33) comprises a crowd gate provided for having milking animals to walk towards said plurality of automatic milking stations (31).

12. The arrangement of claim 1 wherein said milking area (13) comprises an animal identifier arrangement for identifying the milking animals when or after having entered one of said automatic milking stations (31).

13. The arrangement of claim 1 wherein said milking area (13) comprises an exit passage (35) provided for receiving the milking animals after having exited from said plurality of automatic milking stations (31), said exit passage arranged for feeding the milked animals to the passage way (15).

14. The arrangement of claim 13 wherein said exit passage (35) is wide enough to allow milking animals to pass each other.

15. The arrangement of claim 13 wherein said exit passage (35) is provided with a crowd gate adapted to have milking animals to walk away from said plurality of automatic milking stations (31).

16. The arrangement of claim 1 wherein said milking area (13) comprises a post-milking waiting area (37) provided for keeping milking animals from one of said sections (17).

17. The arrangement of claim 16 wherein said post-milking area (37) is provided with a crowd gate adapted to force milking animals to leave said post-milking area (37).

18. The arrangement of claim 1 wherein said milking area (13) comprises a treatment area (39), to which milking animals that are to be treated are allowed or forced to enter.

19. The arrangement of claim 1 wherein said milking area (13) comprises a plurality of automatic milking stations (31) and a pre-milking waiting area (33), an animal identifier arrangement, an exit passage (35), a post-milking area (37), a treatment area (39), and one or several crowd gates on each side of said passage way (15).

20. The arrangement of claim 1 wherein said passage way (15) is provided with a crowd gate adapted to force milking animals to walk back and forth between said sections (17) and said milking area (13).

21. An arrangement for housing and milking a large number of milking animals, comprising:
    first and second resting and feeding areas (11),
        each resting and feeding area (11) comprised of plural adjacent enclosed sections (17),
        each section (17) sized for allowing plural milking animals to rest therein and be supplied with feed,
        each section (17) comprising a respective entry/exit gate (19) located along a first side thereof,
        each section comprising a feeding area (23) along a second side thereof, the second side being opposite the first side;
    a milking area (13) located between the first and second resting and feeding areas (11), the milking area (13) comprising a plurality of automatic milking stations (31) for milking the milking animals, each automatic milking station (31) comprising milking equipment which is automatically attached to the teats of a milking animal present in the automatic milking station by a robot arm; and
    a passage way (15) extending through said first resting and feeding area (11), through said milking area (13), and through said second resting and feeding area (11),
    the passage way (15) dividing each of said first resting and feeding area (11), said milking area, and said second resting and feeding area (11) into a respective upper and lower side areas,
    each gate of the sections (17) opening to the passage way (15) at a different location so that the passage way (15) interconnects the gate of each section (17) with the milking area, along the passage way (15) the milking animals are capable of being walked in order to move back and forth between the respective section (17) and the milking area (13), wherein,
    a first plurality of said sections (17) of each of the first and second resting and feeding areas (11) are arranged in a first row (21) along an upper side of the passage way (15) so that a lower end of each of said first plurality of said sections (17) faces the upper side of said passage way (15),
    a second plurality of said sections (17) of each of the first and second resting and feeding areas (11) are arranged in a second row (21) along a lower side of the passage way (15) so that an upper end of each of said second plurality of said sections (17) faces the lower side of said passage way (15), and
    said milking area comprises a first plurality of said automatic milking stations (31) arranged along an upper side of the passage way (15) and a second plurality of said automatic milking stations (31) arranged along a lower side of the passage way (15).

\* \* \* \* \*